G. E. HOGLUND.
LOCATION INDICATING DEVICE.
APPLICATION FILED APR. 25, 1910.
990,739.
Patented Apr. 25, 1911.
2 SHEETS—SHEET 1.
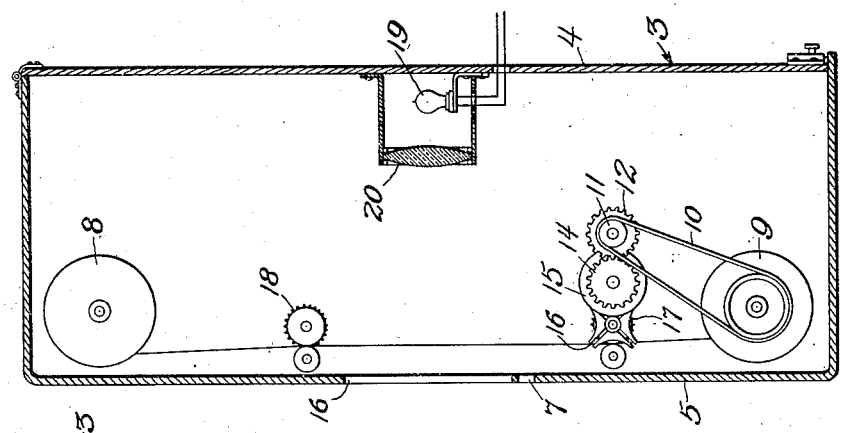
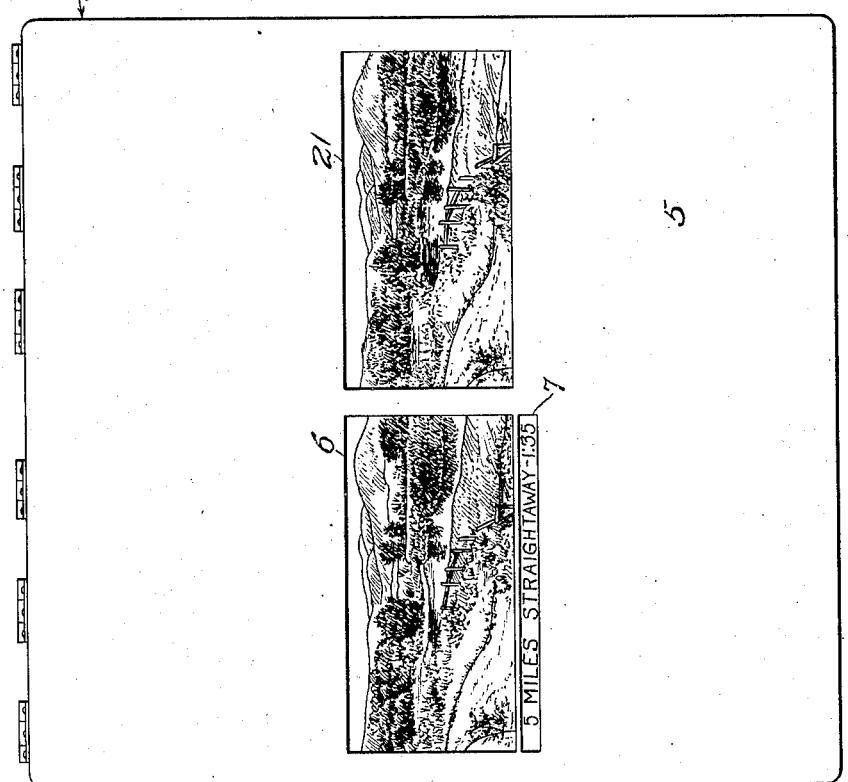

G. E. HOGLUND.
LOCATION INDICATING DEVICE.
APPLICATION FILED APR. 25, 1910.
990,739.
Patented Apr. 25, 1911.
2 SHEETS—SHEET 2.
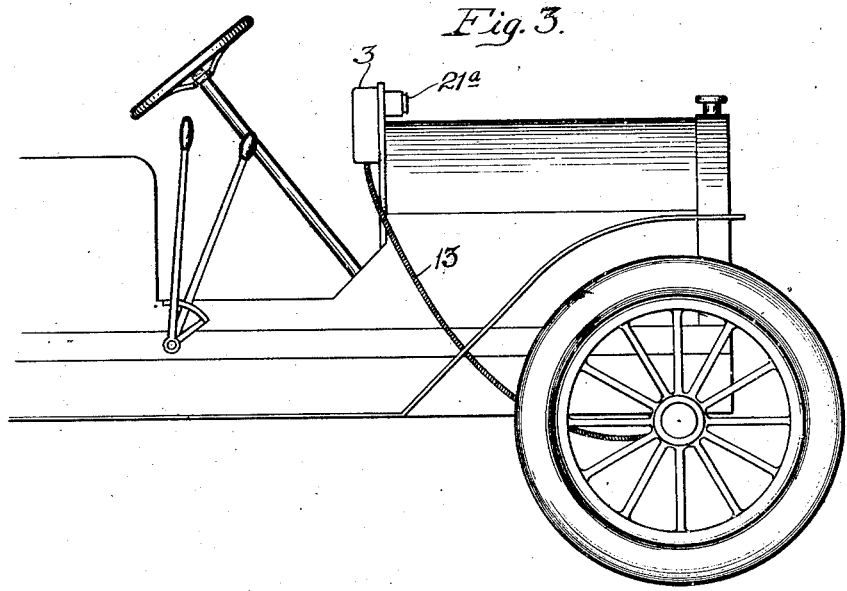
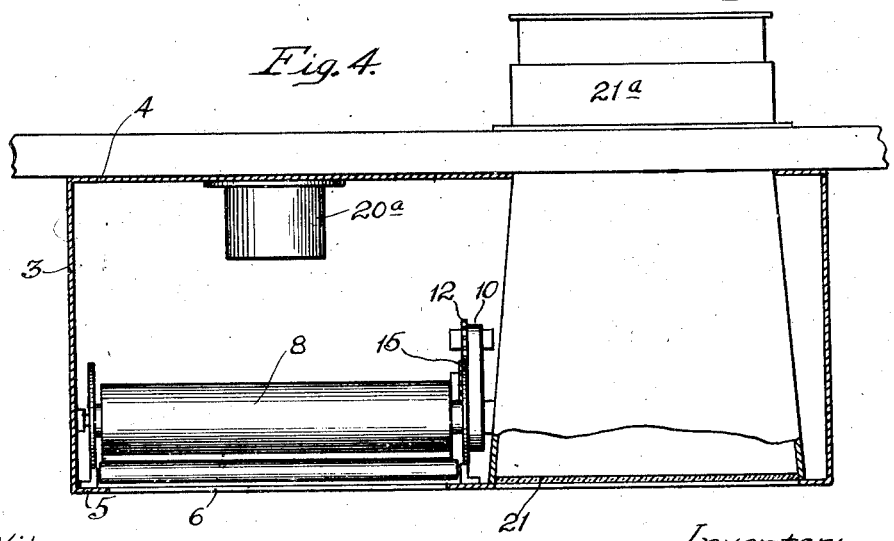
Witnesses:
Ephraim Banning
Thomas A. Banning Jr.
Inventor:
Gustav E. Hoglund.
By Banning & Banning
Attorneys.

UNITED STATES PATENT OFFICE.

GUSTAV E. HOGLUND, OF CHICAGO, ILLINOIS, ASSIGNOR TO WILLIAM N. SELIG, OF CHICAGO, ILLINOIS.

LOCATION-INDICATING DEVICE.

990,739. Specification of Letters Patent. Patented Apr. 25, 1911.

Application filed April 25, 1910. Serial No. 557,443.

*To all whom it may concern:*

Be it known that I, GUSTAV E. HOGLUND, a citizen of the United States, residing at Chicago, in the county of Cook and State of Illinois, have invented certain new and useful Improvements in Location - Indicating Devices, of which the following is a specification.

The present invention relates to a device for displaying a guide chart or map, the nature of which will serve to accurately and definitely guide a traveler to a predetermined destination; and the objects of the invention are, to produce a map or chart comprising a series of views taken at intervals along a line of travel; and to reproduce these views at intervals while the traveler is passing along the route, the view typifying a certain scene along the route being exposed during and for a period before the traveler reaches this particular point in the route.

Further objects of the invention are to append certain statements to each picture, which will contain data pertaining to directions, distances, etc.; to illuminate the picture so that it may be visible at night; to actuate the mechanism for exposing the pictures from the speedometer mechanism of the vehicle; and to position adjacent to the picture, the ground glass of a camera-obscura, so that the traveler by observing the impression on the ground glass and the reproduction on the picture can determine accurately as to whether he is following the proper route.

In the drawings, Figure 1 is a front elevation of the assembled devices; Fig. 2, is a vertical cross section therethrough. Fig. 3, an elevation of the front portion of an automobile with the device of the present invention in place thereon; and Fig. 4, a horizontal section through the part shown in Fig. 1.

The device is inclosed within a casing 3 of any suitable size and configuration, the casing being preferably provided with a hinged back 4, and having its front wall 5 provided with a relatively large opening 6 and a relatively small opening 7. Positioned within the interior of the casing are companion reels 8 and 9, the reel 9 being actuated by a belt 10, driven by a pulley 11, connected to a gear wheel 12, which is actuated by a flexible shaft 13 extending from the speedometer mechanism, not shown. The gear 12 meshes with a gear 14, which is carried by a plate 15, having a contact thereon adapted to actuate a star wheel 16. The star wheel is attached to a feed sprocket 17, which engages with the chart or map to move it past the aperture 6. The mechanism further comprises a sprocket 18, which is utilized for the purpose of keeping the chart taut while it is passing by the aperture. All of the mechanism for actuating the chart is shown merely for the purposes of illustration and is not deemed to be an essential part of this invention, since other means might be devised for moving the chart; and the particular mechanism herein shown is old in film actuating devices for moving picture machines.

The belt 10 is provided for the purpose of permitting a slip connection between the reel 9 and the pulley 11, as it is evident that as the chart is rolled up upon the reel, the size will increase so that a movement of the reel through a certain distance will take up more of the chart during certain periods of operation of the device than at others. Hence, the belt is provided to allow of slippage so as to prevent the tearing of the chart during the feeding operation from one reel to the other.

Positioned in the casing is a lamp 19, located in the rear of a lens 20 inclosed in a casing 20ª, the purpose of which is to illuminate that portion of the map passing in front of the aperture 6, so that it may be visible at night. Located adjacent to the opening 6 is a ground glass plate 21, which reproduces an impression taken by a camera-obscura 21ª located upon the front of the vehicle, so that by noticing the different views upon the ground glass plate and the picture exposed through the opening 6, the traveler may accurately determine whether he is upon the proper route. That is, taking as an an illustration the view shown in the drawings, it will be noted that a turn is indicated in the road in the picture exposed through the opening 6. This view will be exposed for a certain length of time before the turn is reached, so that the traveler is aware that in a short time this turn will be reached. Then, by noticing the impression on the ground glass plate, he will see the turn reproduced thereon as the vehicle approaches it, and in this manner will know positively that he is on the correct route.

In case there should be a fork of the roads, it will be indicated upon the written matter exposed through the opening 7 which road to take. This will eliminate the difficulties so frequently encountered in traveling when it becomes necessary to choose one road or another forking out from the main road. It is also contemplated to embody in the written matter such data as the distance the traveler is from his destination and the time when he should be at the point typified in the picture in order to reach his destination at a predetermined time. The traveler will also be able to know in advance the various grades and turns which he is likely to encounter, so as to gage the speed of his vehicle accordingly. At night this feature of the invention is very material, as in driving at night-time accidents have frequently occurred because of the ignorance of the driver of certain hills or turns occurring in the road.

The mechanism shown for actuating the chart is what is termed the Geneva movement and gives an intermittent movement to the chart; that is to say, the chart is exposed for a relatively long period of time and then moved away so that by arranging the gearing of this mechanism a picture will be exposed after a predetermined number of revolutions of the flexible shaft 13 from the speedometer. This will cause a picture to be exposed at regular intervals along the route, for example, one picture every eighth of a mile. Thus the pictures will be exposed in accordance with the speed of travel of the vehicle, and by placing on the description appended to the picture the time when the traveler should arrive at this point, he will be able to regulate his speed of travel to bring him to a predetermined destination within a certain length of time.

In initially preparing the map, an automobile in the nature of a pilot car, or other suitable vehicle, is sent over the route, and by arranging a camera actuated by the speedometer mechanism, an exposure along the route is made at predetermined intervals. The film thus obtained is reproduced and a plurality of elongated charts containing the views thereon are prepared. To this is added the necessary printing matter and the chart is then complete and ready for usage. By forming the chart in this manner, it is possible to reproduce a chart covering a route embracing a distance of one hundred miles, which will occupy but a very small space when rolled up. This is, of course, an essential feature, as a heavy or cumbersome affair would not be practicable to carry while traveling.

I claim:

An illustrated location indicating device, comprising a surface having thereon inanimate views of scenes along a route, a surface adjacent to said first named surface adapted to transmit to the observer an animate picture of the scenes along the route, the inanimate pictures representing views along the proper route, the animate pictures reproducing the views along the route traveled, whereby when the two views coincide the correctness of the route being taken by the traveler is established, substantially as described.

GUSTAV E. HOGLUND.

Witnesses:
MARY R. FROST,
THOMAS A. BANNING, Jr.